US008141672B2

United States Patent
Kuramochi et al.

(10) Patent No.: US 8,141,672 B2
(45) Date of Patent: Mar. 27, 2012

(54) CANISTER LAYOUT STRUCTURE IN MOTORCYCLE

(75) Inventors: Daisuke Kuramochi, Wako (JP); Hisafumi Shako, Wako (JP); Hikaru Yokomura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 519 days.

(21) Appl. No.: 12/491,535

(22) Filed: Jun. 25, 2009

(65) Prior Publication Data

US 2010/0051369 A1  Mar. 4, 2010

(30) Foreign Application Priority Data

Aug. 29, 2008  (JP) .................. 2008-222073

(51) Int. Cl.
*B60K 15/00* (2006.01)
*F02M 33/02* (2006.01)
(52) U.S. Cl. .................. 180/69.4; 180/219; 123/519
(58) Field of Classification Search .............. 180/69.4, 180/218, 219; 123/519; 224/413
See application file for complete search history.

(56) References Cited

U.S. PATENT DOCUMENTS

| | | | |
|---|---|---|---|
| 2010/0065362 A1* | 3/2010 | Shimura et al. | 180/219 |
| 2010/0078241 A1* | 4/2010 | Maeda et al. | 180/68.3 |
| 2010/0163328 A1* | 7/2010 | Hasegawa | 180/225 |
| 2010/0206653 A1* | 8/2010 | Koike | 180/225 |
| 2010/0242925 A1* | 9/2010 | Yoshida et al. | 123/519 |
| 2010/0243354 A1* | 9/2010 | Inaoka | 180/69.4 |
| 2010/0243355 A1* | 9/2010 | Hosoya et al. | 180/69.4 |
| 2010/0243358 A1* | 9/2010 | Suzuki | 180/219 |
| 2010/0243360 A1* | 9/2010 | Inaoka | 180/225 |
| 2011/0024214 A1* | 2/2011 | Seki et al. | 180/69.4 |
| 2011/0073399 A1* | 3/2011 | Seki | 180/219 |
| 2011/0100742 A1* | 5/2011 | Shibata et al. | 180/219 |
| 2011/0120796 A1* | 5/2011 | Kuramochi et al. | 180/219 |
| 2011/0127098 A1* | 6/2011 | Tsutsui et al. | 180/219 |

FOREIGN PATENT DOCUMENTS

JP  62-111291 A  7/1987

* cited by examiner

*Primary Examiner* — J. Allen Shriver, II
*Assistant Examiner* — Jacob Meyer
(74) *Attorney, Agent, or Firm* — Westerman, Hattori, Daniels & Adrian, LLP; William F. Westerman

(57) ABSTRACT

A canister layout structure in a motorcycle includes a swing arm vertically swingably supported to a rear portion of a body frame and supporting a wheel, a canister located below the swing arm for trapping an evaporative fuel evaporated in a fuel tank, and a center stand pivotably supported to a lower portion of the body frame for making the body frame stand on a road surface when parking. The center stand is retractable to keep a horizontal position substantially parallel to a road surface during running. The canister is located above the center stand in its retracted condition.

20 Claims, 6 Drawing Sheets

CANISTER LAYOUT STRUCTURE IN MOTORCYCLE

TECHNICAL FIELD

The present invention relates to an improvement in canister layout structure in a motorcycle.

BACKGROUND OF THE INVENTION

A motorcycle having a canister located below a swing arm and fixed to a body frame for trapping an evaporative fuel evaporated in a fuel tank is known (see Japanese Utility Model Laid-open No. Sho 62-111291, for example).

Referring to Japanese Utility Model Laid-open No. Sho 62-111291, a canister is provided at a rear lower portion of a main frame for mounting an engine and located below a swing arm for supporting a rear wheel. The canister unit is provided with a bracket for fixing the canister unit to the main frame. The canister unit includes a canister, and a lower portion of the canister is protected by the bracket and other members located below the canister unit for protecting the canister.

SUMMARY OF THE INVENTION

In the case that the canister is located at the lower portion of a vehicle body as mentioned above, it is necessary to protect the lower portion of the canister by providing a protective member in consideration of roughness of a road surface. As a result, the number of parts and the weight of a vehicle body are increased.

It is accordingly an object of the present invention to provide a technique which can reduce the number of parts and the weight of a vehicle body in a motorcycle having a canister at a lower portion of the vehicle body.

In accordance with a first aspect of the invention, there is provided a canister layout structure in a vehicle including a body frame, a swing arm vertically swingably supported to a rear portion of the body frame, a fuel tank, a canister located below the swing arm and fixed to the body frame for trapping an evaporative fuel evaporated in the fuel tank, and a center stand pivotably supported by a lower portion of the body frame for making the body frame stand on a road surface when parking, the center stand being retractable to a horizontal position substantially parallel to a road surface during running, wherein the canister is located above the center stand in its retracted condition.

In accordance with a second aspect of the invention, a pair of right and left subframes extend rearward from a pair of right and left shaft supporting portions formed at a front portion of the swing arm so as to be inclined upward; a cross member extends between the right and left subframes; and the canister is located behind the cross member.

In accordance with a third aspect of the invention, the center stand has a substantially triangular shape, and it includes two leg members extending downward so as to diverge from each other and a center stand cross member extending between the two leg members; and at least a part of the center stand cross member overlaps a rear portion of the canister in plan view of the vehicle when the center stand is in the retracted position.

In accordance with a fourth aspect of the invention, the swing arm includes two arm members extending on the right and left sides of the vehicle and a swing arm cross member extending between the two arm members; and the swing arm cross member is located so as to overlap the canister in plan view of the vehicle.

In accordance with a fifth aspect of the invention, a pair of right and left step brackets for respectively supporting a pair of right and left passenger steps as footrests for a passenger are provided at the lower portion of the body frame; and the canister is surrounded by the body frame, the swing arm, the center stand, and the step brackets, and is exposed to the outside of the vehicle as in side elevation of the vehicle.

In accordance with a sixth aspect of the invention, piping is connected to the canister; and the piping is located between the cross member and the swing arm so as to extend along the cross member.

In accordance with a seventh aspect of the invention, an engine is mounted on the body frame; an exhaust pipe extends from the engine; the exhaust pipe is provided with a first large-diameter portion and a second large-diameter portion; and the canister is located between the first large-diameter portion and the second large-diameter portion in side elevation of the vehicle.

According to the first aspect of the invention, the canister is located above the center stand in its retracted condition. That is, the center stand is located below the canister. Accordingly, the lower portion of the canister can be protected by the center stand. Since the canister is protected by the center stand, it is not necessary to provide any dedicated protective member below the canister. That is, the center stand serves also as a protective member for protecting the lower portion of the canister, and no dedicated protective member for protecting the canister is needed. As a result, the number of parts can be reduced and the weight of the vehicle can also be reduced.

According to the second aspect of the invention, the right and left subframes extend rearward from the right and left shaft supporting portions of the swing arm so as to be inclined upward, and the cross member extends between these right and left subframes. Further, the canister is located behind this cross member. With the structure of this cross member, the rigidity of the shaft supporting portions for supporting a cross member for the swing arm can be improved. Further, the front portion of the canister can be protected by the cross member.

According to the third aspect of the invention, at least a part of the center stand cross member overlaps the rear portion of the canister in bottom plan view of the vehicle in the retracted condition of the center stand. Accordingly, by overlapping the center stand cross member and the canister as mentioned above, the lower portion of the canister can be further protected by the center stand cross member without increasing the weight of the center stand.

According to the fourth aspect of the invention, the swing arm cross member is so located as to overlap the canister in plan view of the vehicle. That is, the swing arm cross member is located above the canister, so that the upper portion of the canister can be protected by the swing arm cross member.

According to the fifth aspect of the invention, the canister is surrounded by the body frame, the swing arm, the center stand, and the step brackets in side elevation of the vehicle. Thus, the canister can be protected by these surrounding members. Further, the side portion of the canister is exposed to the outside of the vehicle. Accordingly, the maintainability of the canister can be improved.

According to the sixth aspect of the invention, the piping connected to the canister is located between the cross member and the swing arm. Accordingly, interference of the piping with the swing arm can be prevented. Furthermore, the piping is arranged so as to extend along the cross member. Accordingly, the piping can be fixed to the cross member. The piping can be straightened up along the cross member, thereby further improving the appearance of the vehicle.

According to the seventh aspect of the invention, the canister is located between the first large-diameter portion and the second large-diameter portion in side elevation of the vehicle. With this structure, a predetermined clearance can be ensured between the canister and the exhaust pipe, and the exhaust pipe can be located close to the vehicle body, thereby suppressing an increase in lateral size of the vehicle. Accordingly, the vehicle can be made compact. Furthermore, the worker's hand can easily access the canister. Thus, the visibility and accessibility of the canister can be improved, so that the maintainability of the canister and its peripheral portion can be improved.

BRIEF DESCRIPTION OF THE DRAWINGS

The advantages of the invention will become apparent in the following description taken in conjunction with the drawings, wherein.

DETAILED DESCRIPTION OF THE INVENTION

Figure 1:
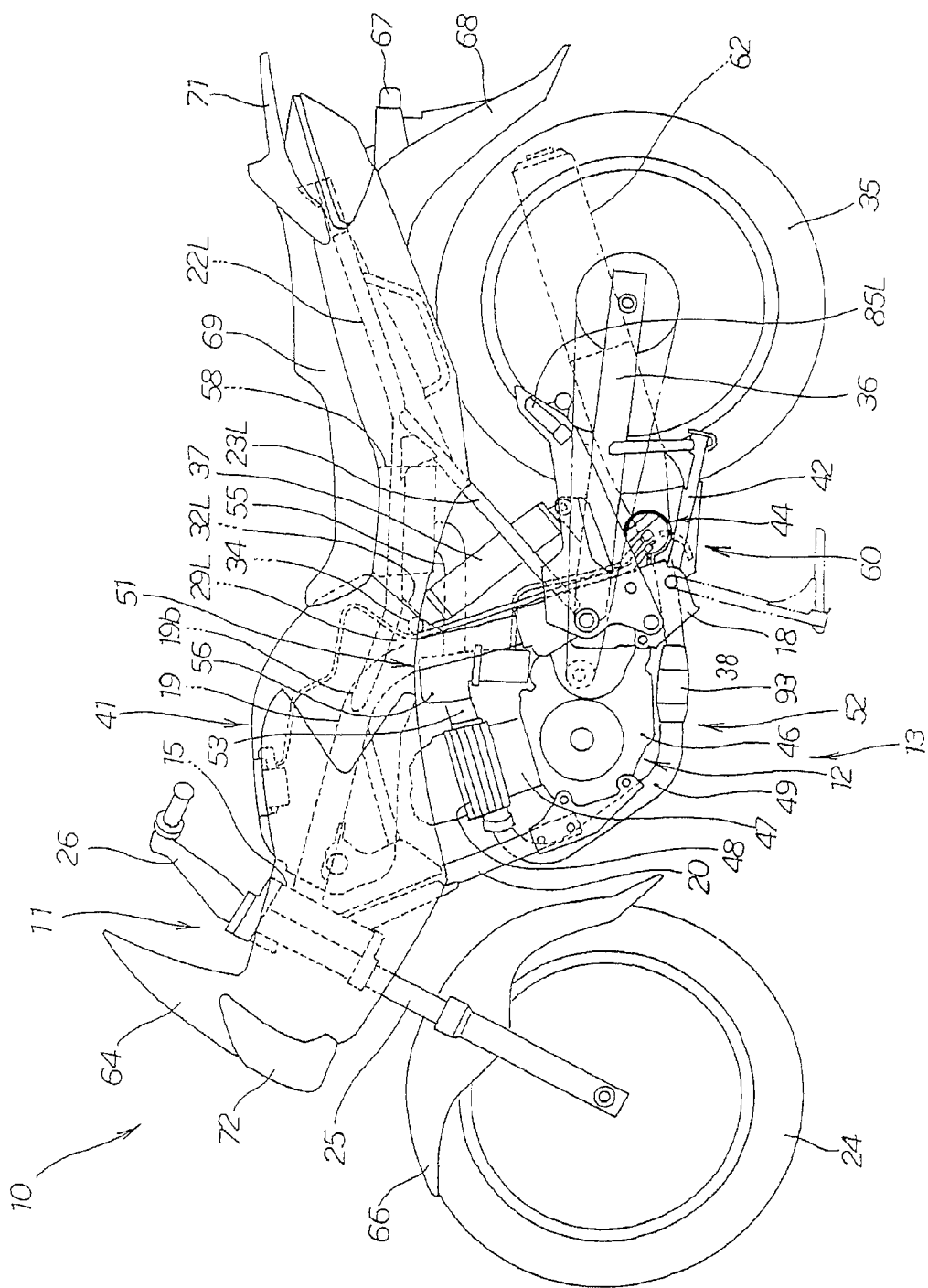
FIG. 1 is a left side view of a motorcycle according to the present invention.

A preferred embodiment of the present invention will now be described with reference to the attached drawings. The orientation of each drawing is the same as that of the reference numerals included therein.

FIG. 1 is a left side view of a motorcycle 10 according to the present invention. The motorcycle 10 is provided with a body frame 11 and a drive unit 13 including an engine 12 mounted to the body frame 11.

The body frame 11 includes a head pipe 15, a main frame 19 extending rearward from the head pipe 15 so as to be inclined downward, a down frame 20 extending rearward from the head pipe 15 so as to be inclined downward on the lower side of the main frame 19, a pair of right and left seat rails 22R and 22L (only the left seat rail 22L being shown) as an upper frame extending rearward from a rear portion of the main frame 19, a pivot plate 18 mounted to a rear lower portion of the main frame 19 for mounting the engine 12, and a pair of right and left subframes 23R and 23L (only the left subframe 23L being shown) extending rearward from the pivot plate 18 so as to be inclined upward for respectively supporting the seat rails 22R and 22L.

The motorcycle 10 is provided with a steering unit for steering a front wheel 24. The steering unit includes a front fork 25 extending downward from the head pipe 15 so as to be inclined frontward for supporting the front wheel 24 and a steering handle 26 mounted on the upper end of the front fork 25.

The motorcycle 10 is provided with a rear suspension unit. The rear suspension unit includes a pair of right and left brackets 32R and 32L (only the left bracket 32L being shown) provided in the vicinity of right and left connecting portions 29R and 29L (only the left connecting portion 29L being shown) for connecting the main frame 19 and the right and left seat rails 22R and 22L, a rear suspension bar 34 as a cross member horizontally extending between the right and left brackets 32R and 32L, and a rear cushion unit 37 connected between the rear suspension bar 34 and a rear swing arm 36 (swing arm 36) for supporting a rear wheel 35.

That is, the rear suspension unit constitutes a rear portion of the body frame 11, and the swing arm 36 for rotatably supporting the rear wheel 35 as a wheel at the rear ends is pivotably supported through a pivot shaft 38 to the body frame 11.

A fuel tank 41 for storing fuel is mounted on the main frame 19 above the engine 12 so as to straddle the main frame 19.

A center stand 42 is pivotably mounted to the pivot plate 18 as a lower component of the body frame 11. The center stand 42 functions to make the body frame 11 stand on a road surface when parking. The center stand 42 is retractable to keep a horizontal position substantially parallel to a road surface during running. A canister 44 for trapping an evaporative fuel evaporated in the fuel tank 41 is provided above the center stand 42 and behind the pivot plate 18. The configuration of an evaporative fuel processing system 60 including the canister 44 will be described later.

The engine 12 is integrally formed with a transmission at the rear portion. The engine 12 is a drive source having a crankcase 46, a cylinder block 47 mounted on the crankcase 46, and a cylinder head 48 mounted on the cylinder block 47.

An intake system 51 is mounted to a rear portion of the cylinder head 48, and an exhaust pipe 49 as a component of an exhaust system 52 is mounted to a front portion of the cylinder head 48.

The intake system 51 includes a carburetor 56 connected through an intake pipe 53 to the cylinder head 48 and an air cleaner 58 connected through a connecting tube 55 to the carburetor 56. The evaporative fuel processing system 60 to be hereinafter described is connected to the carburetor 56.

The exhaust system 52 includes the exhaust pipe 49 extending from the cylinder head 48 of the engine 12 for conveying the exhaust gas discharged from the engine 12 and a muffler 62 connected to the rear end of the exhaust pipe 49.

The motorcycle 10 further includes a front fender 66, tail lamp 67, rear fender 68, tandem seat 69, grab rail 71, headlight 72, and a pair of right and left passenger steps 85R and 85L (only the left passenger step 85L being shown).

Figure 2:
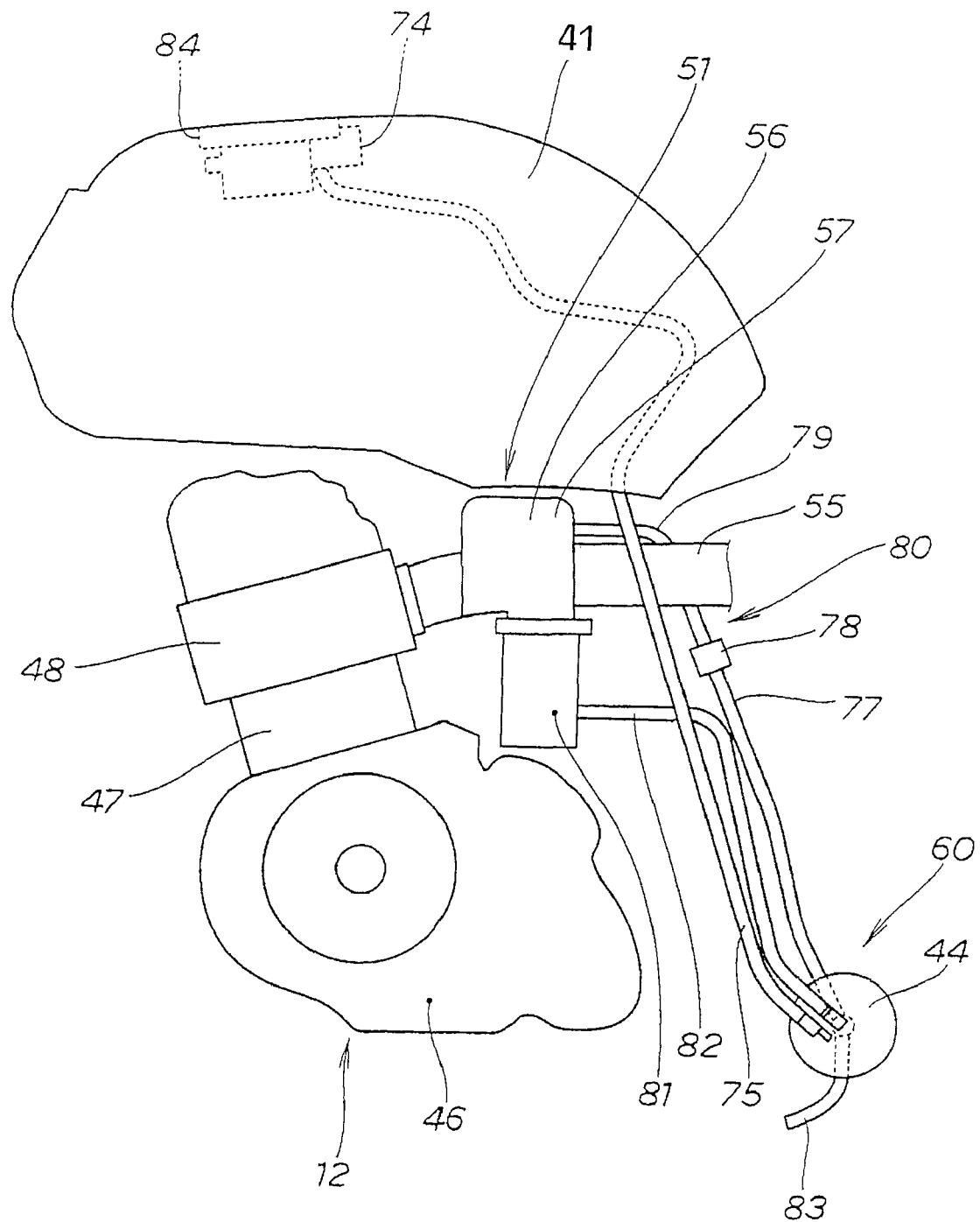
FIG. 2 is a side view showing an evaporative fuel processing system included in the motorcycle shown in FIG. 1.

FIG. 2 is a side view showing the evaporative fuel processing system 60 included in the motorcycle 10 according to the present invention. The evaporative fuel processing system 60 is connected between the fuel tank 41 and the carburetor 56, and functions to introduce the evaporative fuel produced by evaporation of the liquid fuel stored in the fuel tank 41 to the carburetor 56 of the intake system 51.

The evaporative fuel processing system 60 is a system for introducing HC (hydrocarbon) as a component of the evaporative fuel present in the fuel tank to the intake system together with an air-fuel mixture under an intake manifold vacuum of the engine, wherein the HC introduced to the intake system is burned with the air-fuel mixture in the engine. The evaporative fuel processing system 60 includes a vapor-liquid separator 74 provided at an upper portion of the fuel tank 41 for separating the evaporative fuel from the liquid fuel, a discharge pipe 75 having one end connected to the vapor-liquid separator 74, the canister 44 connected to the other end of the discharge pipe 75 for adsorbing the evaporative fuel, a first purge pipe 77 having one end connected to the canister 44, a purge control valve 78 connected to the other end of the first purge pipe 77, a second purge pipe 79 having one end connected to the purge control valve 78 and the other end connected to the carburetor 56, more specifically, connected to a side surface of a carburetor body 57 constituting the carburetor 56, a canister air cleaner 81 for cleaning a fresh air to be introduced into the canister 44, a fresh air supply pipe 82 for connecting the canister air cleaner 81 to the canister 44, and a vent pipe 83 extending downward from the canister 44 so as to be exposed to the atmospheric air at the lower end, thereby making the communication between the inside and the outside of the canister 44. Reference numeral 84 denotes a fuel filler cap for closing a fuel filler opening.

The vapor-liquid separator 74 allows the discharge of the evaporative fuel through the discharge pipe 75 even when the fuel is filled into the fuel tank 41 to its upper limit (i.e., even in a full-tank condition).

The canister 44 is a container filled with active carbon for temporarily adsorbing the evaporative fuel.

The first purge pipe 78 and the second purge pipe 79 constitute a purge pipe 80, and the purge control valve 78 is provided in the middle of the purge pipe 80.

The purge control valve 78 is a one-way valve for controlling the amount of evaporative fuel to be sucked into the carburetor 56, so as to prevent that a large amount of evaporative fuel may be sucked into the carburetor 56 at a time to cause a large variation in air-fuel ratio of the air-fuel mixture. When a vacuum greater than or equal to a predetermined value is applied, the purge control valve 78 allows the flow of evaporative fuel from the canister 44 to the carburetor 56 and checks the flow of gas from the carburetor 56 to the canister 44.

The canister air cleaner 81 is provided independently of the air cleaner 58 (see FIG. 1).

The operation of the evaporative fuel processing system 60 will now be described.

The evaporative fuel introduced into the canister 44 is adsorbed by the active carbon contained in the canister 44. When an intake manifold vacuum is applied to the canister 44, fresh air is introduced through the fresh air supply pipe 82 into the canister 44, and the evaporative fuel is desorbed from the active carbon and sucked into the carburetor 56.

Figure 3:
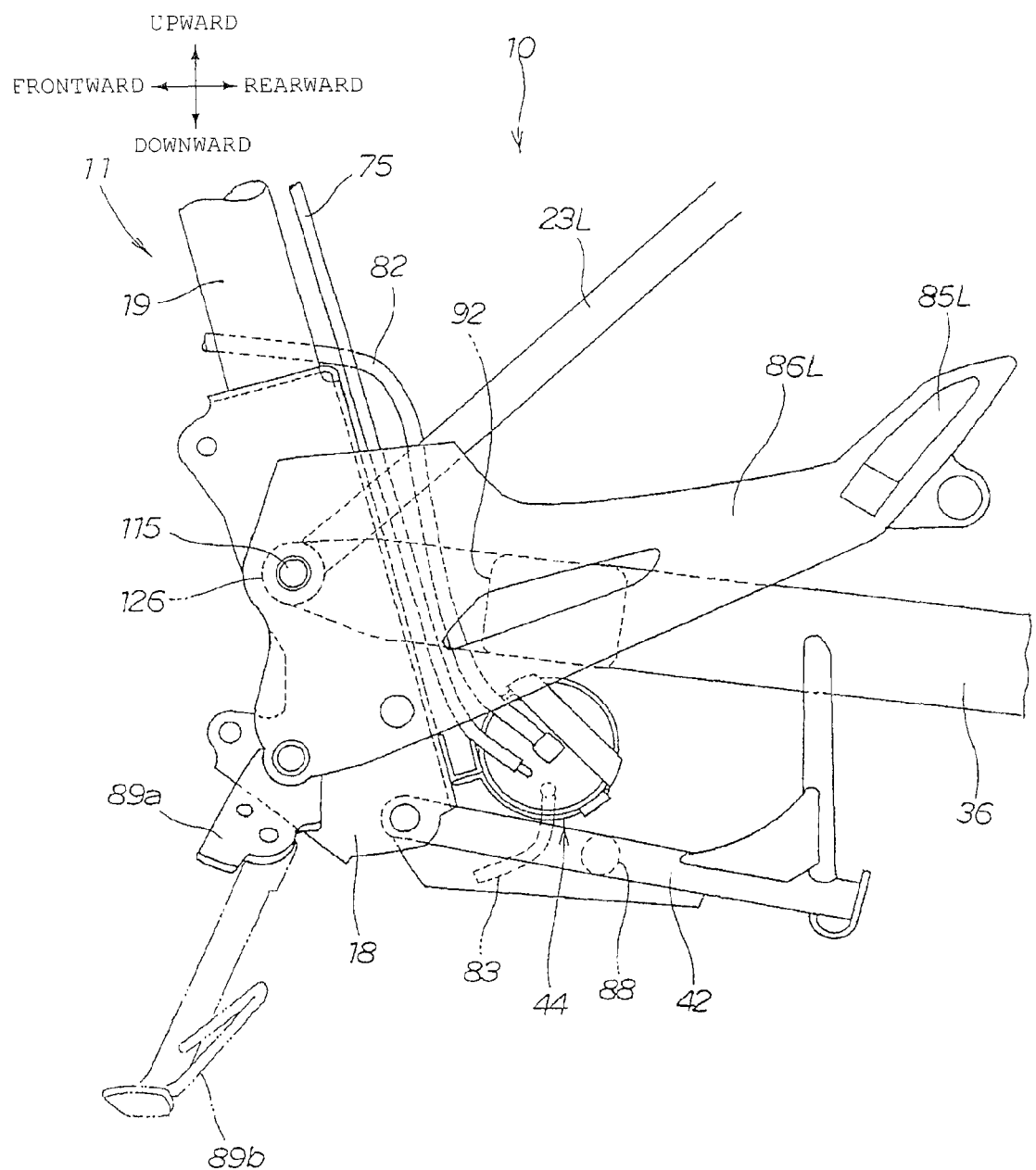
FIG. 3 is a side view of a relevant part of the motorcycle shown in FIG. 1.

FIG. 3 is a side view of a relevant part of the motorcycle 10 according to the present invention. As shown in FIG. 3, the canister 44 for adsorbing the evaporative fuel evaporated in the fuel tank is mounted on the body frame 11 at a position below the swing arm 36. The canister 44 extends substantially parallel to a road surface, and it is located above the center stand 42 in its retracted condition.

A pair of right and left step brackets 86R and 86L (only the left step bracket 86L being shown) for respectively supporting the right and left passenger steps 85R and 85L as the footrests for a passenger are provided at the lower portion of the body frame 11. More specifically, the right and left step brackets 86R and 86L are mounted on the right and left side surfaces of the pivot plate 18 and extend rearward therefrom.

As viewed in side elevation of the vehicle, the canister 44 is surrounded by the body frame 11, the swing arm 36, the center stand 42, and the step brackets 86R and 86L, and a part of the side surface of the canister 44 is exposed to the outside of the vehicle. In particular, connected portions of the discharge pipe 75 and the fresh air supply pipe 82 connected to the side surface of the canister 44 are exposed to the outside of the vehicle. In FIG. 3, reference numerals 89a and 89b denote a side stand bracket and a side stand, respectively.

As described above, the canister 44 is surrounded by the body frame 11, the swing arm 36, the center stand 42, and the step brackets 86R and 86L. Accordingly, the canister 44 can be protected by these surrounding members. In addition, since a part of the side surface of the canister 44 is exposed to the outside of the vehicle, the maintainability of the canister 44 can be improved.

Figure 4:
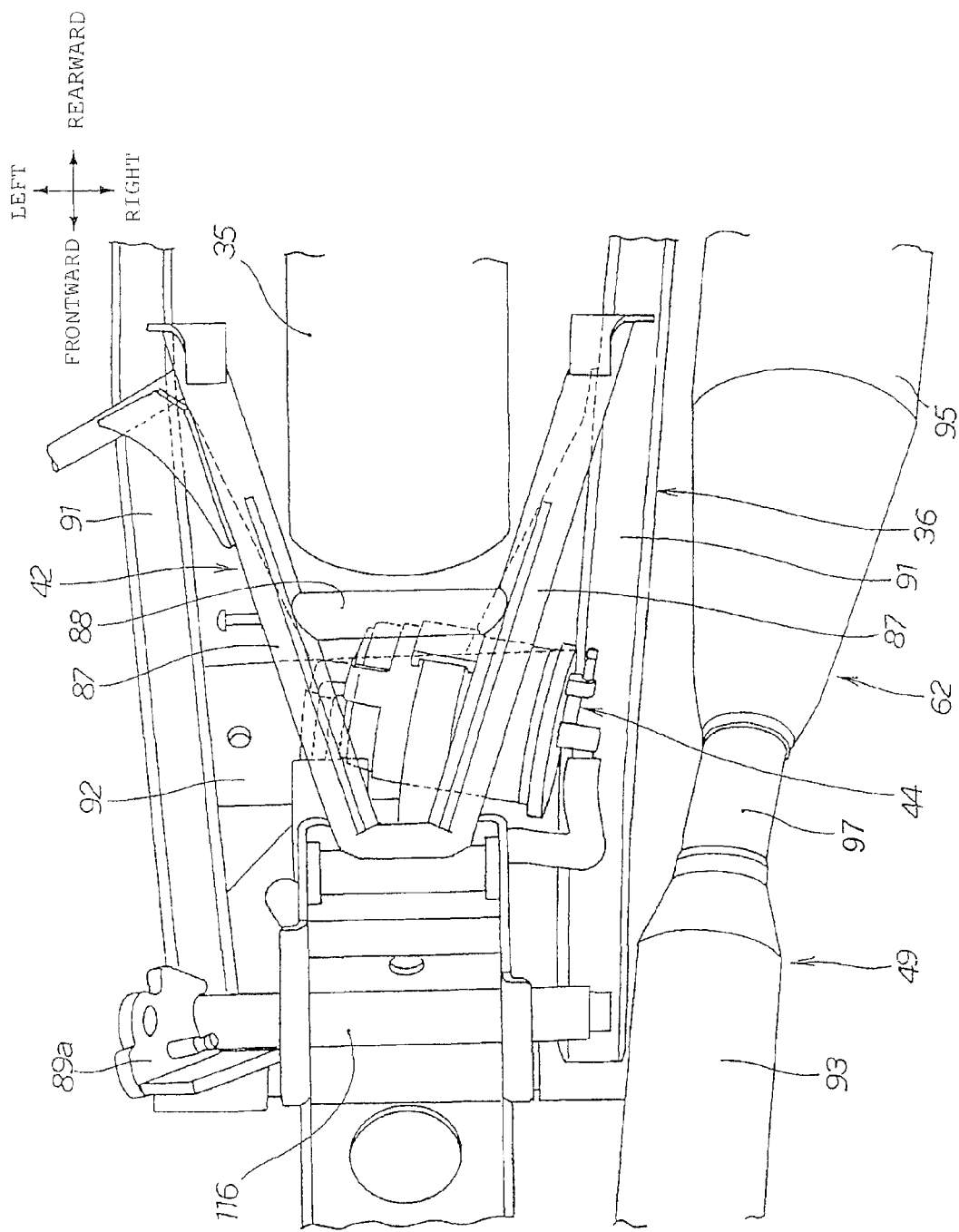
FIG. 4 is a bottom plan view of a relevant part of the motorcycle shown in FIG. 1.

FIG. 4 is a bottom plan view of an essential part of the motorcycle 10 according to the present invention. Referring to FIGS. 3 and 4, the center stand 42 has a substantially triangular shape, and it includes two leg members 87 extending downward so as to be diverged from each other in the condition where the center stand 44 is operated to make the body frame 11 stand on a road surface in parking. Further, a center stand cross member 88 extends between these two leg members 87. In the retracted condition of the center stand 42, at least a part of the center stand cross member 88 overlaps the rear portion of the canister 44 as viewed in bottom plan of the vehicle.

As described above, the center stand cross member 88 is so located as to overlap the canister 44. Accordingly, the lower portion of the canister 44 can be protected by the center stand 42 without increasing the weight thereof.

The swing arm 36 includes two arm members 91 extending on the right and left sides of the vehicle and a swing arm cross member 92 extending between these two arm members 91. As viewed in plan, the swing arm cross member 92 is so located as to overlap the canister 44.

Since the swing arm cross member 92 is located above the canister 44, the upper portion of the canister 44 can be protected by the swing arm cross member 92.

The exhaust pipe 49 extending from the engine 12 is provided with a catalyst containing large-diameter portion 93. The muffler 62 is connected through a small-diameter portion 97 to the catalyst containing large-diameter portion 93. The muffler 62 is provided with a muffler large-diameter portion 95.

In addition, as viewed in side elevation of the vehicle, the canister 44 is located between the catalyst containing large-diameter portion 93 and the muffler large-diameter portion 95. That is, the canister 44 is located laterally inside of the small-diameter portion 97 between the catalyst containing large-diameter portion 93 and the muffler large-diameter portion 95. With this structure, the clearance between the canister 44 and the exhaust pipe 49 can be sufficiently ensured and the exhaust pipe 49 can be located close to the vehicle body, thereby suppressing an increase in lateral size of the vehicle. Accordingly, the vehicle can be made compact.

Since the canister 44 is located laterally inside of the small-diameter portion 97, the worker's hand can easily access to the canister 44. Thus, the visibility and accessibility to the canister 44 can be improved, so that the maintainability of the canister 44 and its peripheral portion can be improved.

Figure 5:
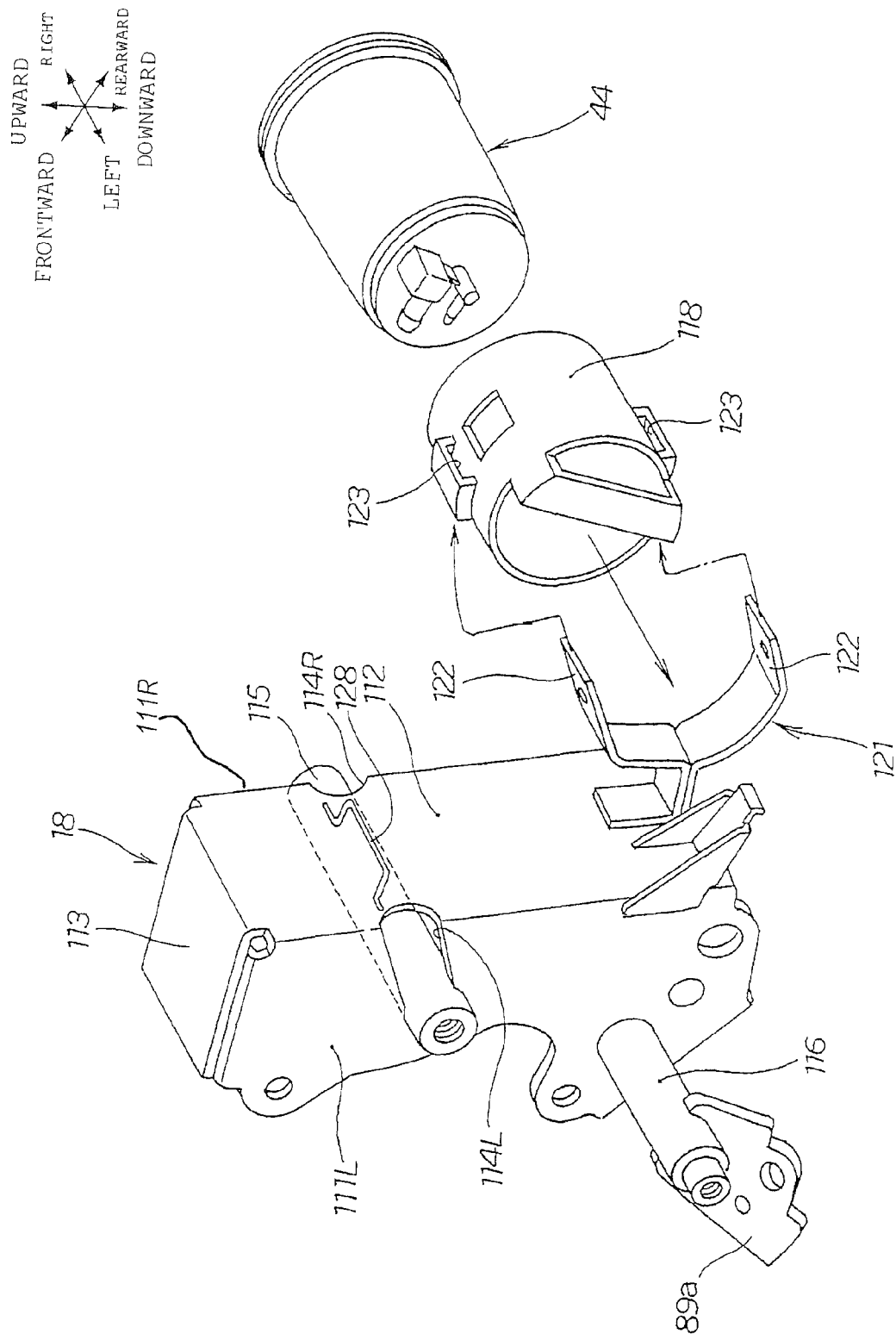
FIG. 5 is an exploded perspective view illustrating a mounting structure for a canister in the motorcycle shown in FIG. 1.

FIG. 5 is an exploded perspective view for illustrating a mounting structure for the canister 44 in the motorcycle 10 according to the present invention. The pivot plate 18 is formed by bending a sheet, and it is composed of a pair of right and left side flat portions 111R and 111L, a rear flat portion 112 connecting the right and left side flat portions 111R and 111L, and an upper flat portion 113 bent from the upper end of the rear flat portion 112 and located between the upper ends of the right and left side flat portions 111R and 111L.

The pivot plate 18 is connected to the right and left subframes 23R and 23L (see FIG. 3) to function as a cross member. The right and left side flat portions 111R and 111L of the pivot plate 18 are formed with cutouts 114R and 114L, respectively. A pivot pipe 115 is inserted through the cutouts 114R and 114L and mounted to the pivot plate 18. Further, a pipe 116 is inserted through the right and left side flat portions 111R and 111L at a position below the pivot pipe 115.

The canister 44 is surrounded by a shock absorbing member 118 formed of an elastic material such as rubber. The shock absorbing member 118 thus surrounding the canister 44 is mounted to a canister bracket 121. The canister bracket 121 is mounted on the rear flat portion 112 of the pivot plate 18. The canister bracket 121 has two arm portions 122, and the shock absorbing member 118 has two engaging portions 123 for respectively engaging the two arm portions 122 of the canister bracket 121. Further, a piping stay 128 for holding piping 125 (see FIG. 6) is provided on the rear flat portion 112 of the pivot plate 18.

Figure 6:
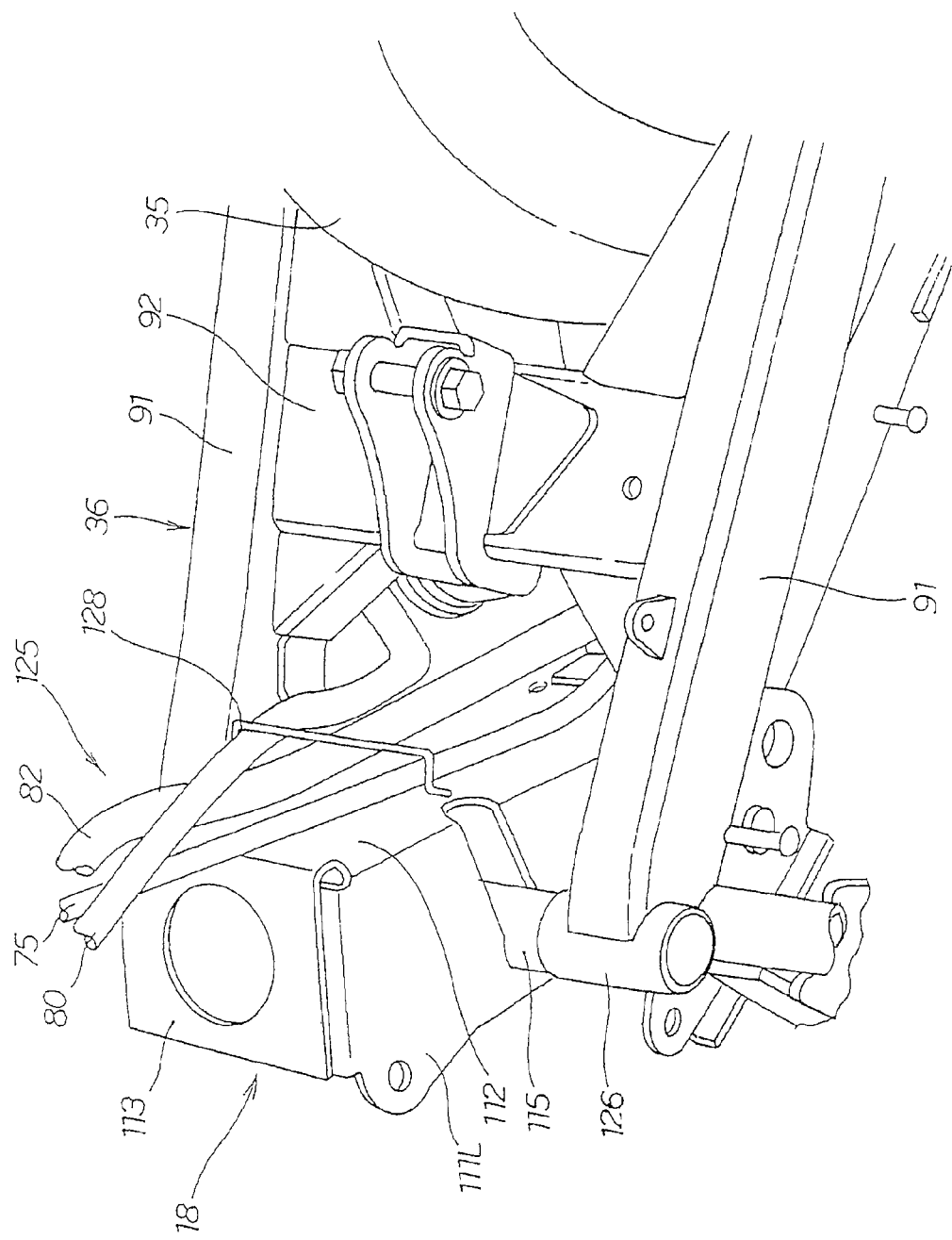
FIG. 6 is a perspective view illustrating the arrangement of piping connected to the canister in the motorcycle shown in FIG. 1.

FIG. 6 is a perspective view for illustrating the arrangement of the piping 125 connected to the canister 44 (see FIG. 4) in the motorcycle 10 according to the present invention. The piping 125 connected to the canister 44 (see FIG. 4) is located between the pivot plate 18 as a cross member and the swing arm 36 so as to extend along the rear flat portion 112 of the pivot plate 18.

The piping 125 includes the discharge pipe 75, the purge pipe 80, and the fresh air supply pipe 82.

As described above, the piping 125 connected to the canister 44 is located between the pivot plate 18 and the swing arm 36. Accordingly, interference of the piping 125 with the swing arm 36 can be prevented.

In addition, the piping 125 is arranged so as to extend along the rear flat portion 112 of the pivot plate 18. Accordingly, the piping 125 can be fixed to the pivot plate 18 as a cross member. That is, the piping 125 can be straightened up along the pivot plate 18, thereby further improving the appearance of the vehicle.

As shown in FIGS. 3 and 6, a pair of right and left shaft supporting portions 126 are formed at the front ends of the right and left arm members 91 of the swing arm 36, and the right and left subframes 23R and 23L extend rearward from the right and left shaft supporting portions 126 so as to be inclined upward. The pivot plate 18 as a cross member is connected between the right and left subframes 23R and 23L, and the canister 44 is located behind the pivot plate 18.

The pivot pipe 115 extends through the right and left side flat portions 111R and 111L of the pivot plate 18, so that the rigidity of the right and left shaft supporting portions 126 can be improved.

According to the present invention, the canister 44 is located above the center stand 42 in its retracted condition. That is, the center stand 42 is located below the canister 44. Accordingly, the lower portion of the canister 44 can be protected by the center stand 42.

Thus, the canister 44 can be protected by the center stand 42. Accordingly, it is not necessary to provide any dedicated protective member below the canister 44. That is, the center stand 42 serves also as a protective member for protecting the lower portion of the canister 44, and no dedicated protective member for protecting the canister 44 is needed. As a result, the number of parts can be reduced and the weight of the vehicle can also be reduced.

While the present invention is applied to a motorcycle in this preferred embodiment, the present invention is applicable also to a saddle seat type vehicle having a center stand.

The present invention is suitable for a motorcycle having a canister for trapping an evaporative fuel below a swing arm.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A canister layout structure in a vehicle, comprising:
    a body frame;
    a swing arm vertically swingably supported by a rear portion of said body frame;
    a canister for trapping an evaporative fuel evaporated in a fuel tank, said canister being disposed below said swing arm and fixed to said body frame; and
    a center stand supported by a lower portion of said body frame and pivotable to a retracted position substantially parallel to a road surface when running,
    wherein said canister is disposed above said center stand when said center stand is in the retracted position.

2. The canister layout structure according to claim 1, further comprising:
    a pair of upwardly inclined right and left subframes extending rearward from a pair of right and left shaft supporting portions formed at a front portion of said swing arm; and
    a cross member extending between said right and left subframes,
    wherein said canister is disposed behind said cross member.

3. The canister layout structure according to claim 1,
    wherein said center stand has a substantially triangular shape, and includes two leg members extending downward to diverge from each other and a center stand cross member extending between said two leg members, and
    wherein at least a part of said center stand cross member overlaps a rear portion of said canister in a plan view of the vehicle when said center stand is in the retracted position.

4. The canister layout structure according to claim 2, wherein:
    wherein said center stand has a substantially triangular shape, and includes two leg members extending downward to diverge from each other and a center stand cross member extending between said two leg members, and
    wherein at least a part of said center stand cross member overlaps a rear portion of said canister in a plan view of the vehicle when said center stand is in the retracted position.

5. The canister layout structure according to claim 1,
    wherein said swing arm includes two arm members extending on the right and left sides of the vehicle and a swing arm cross member extending between said two arm members,
    wherein said swing arm cross member overlaps said canister in a plan view of the vehicle.

6. The canister layout structure according to claim 2,
    wherein said swing arm includes two arm members extending on the right and left sides of the vehicle and a swing arm cross member extending between said two arm members,
    wherein said swing arm cross member overlaps said canister in a plan view of the vehicle.

7. The canister layout structure according to claim 3,
    wherein said swing arm includes two arm members extending on the right and left sides of the vehicle and a swing arm cross member extending between said two arm members,
    wherein said swing arm cross member overlaps said canister in the plan view of the vehicle.

8. The canister layout structure according to claim 4,
wherein said swing arm includes two arm members extending on the right and left sides of the vehicle and a swing arm cross member extending between said two arm members,
wherein said swing arm cross member overlaps said canister in the plan view of the vehicle.

9. The canister layout structure according to claim 1, further comprising a pair of right and left step brackets for respectively supporting a pair of right and left passenger steps as footrests for a passenger, said pair of right and left step brackets being disposed at the lower portion of said body frame,
wherein said canister is surrounded by said body frame, said swing arm, said center stand, and said pair of right and left step brackets, and
wherein said canister is exposed to the outside of the vehicle as viewed in a side elevation of the vehicle.

10. The canister layout structure according to claim 2, further comprising a pair of right and left step brackets for respectively supporting a pair of right and left passenger steps as footrests for a passenger, said pair of right and left step brackets being disposed at the lower portion of said body frame,
wherein said canister is surrounded by said body frame, said swing arm, said center stand, and said pair of right and left step brackets, and
wherein said canister is exposed to the outside of the vehicle as viewed in a side elevation of the vehicle.

11. The canister layout structure according to claim 3, further comprising a pair of right and left step brackets for respectively supporting a pair of right and left passenger steps as footrests for a passenger, said pair of right and left step brackets being disposed at the lower portion of said body frame,
wherein said canister is surrounded by said body frame, said swing arm, said center stand, and said pair of right and left step brackets, and
wherein said canister is exposed to the outside of the vehicle as viewed in a side elevation of the vehicle.

12. The canister layout structure according to claim 4, further comprising a pair of right and left step brackets for respectively supporting a pair of right and left passenger steps as footrests for a passenger, said pair of right and left step brackets being disposed at the lower portion of said body frame,
wherein said canister is surrounded by said body frame, said swing arm, said center stand, and said pair of right and left step brackets, and
wherein said canister is exposed to the outside of the vehicle as viewed in a side elevation of the vehicle.

13. The canister layout structure according to claim 5, further comprising a pair of right and left step brackets for respectively supporting a pair of right and left passenger steps as footrests for a passenger, said pair of right and left step brackets being disposed at the lower portion of said body frame,
wherein said canister is surrounded by said body frame, said swing arm, said center stand, and said pair of right and left step brackets, and
wherein said canister is exposed to the outside of the vehicle as viewed in a side elevation of the vehicle.

14. The canister layout structure according to claim 6, further comprising a pair of right and left step brackets for respectively supporting a pair of right and left passenger steps as footrests for a passenger, said pair of right and left step brackets being disposed at the lower portion of said body frame,
wherein said canister is surrounded by said body frame, said swing arm, said center stand, and said pair of right and left step brackets, and
wherein said canister is exposed to the outside of the vehicle as viewed in a side elevation of the vehicle.

15. The canister layout structure according to claim 7, further comprising a pair of right and left step brackets for respectively supporting a pair of right and left passenger steps as footrests for a passenger, said pair of right and left step brackets being disposed at the lower portion of said body frame,
wherein said canister is surrounded by said body frame, said swing arm, said center stand, and said pair of right and left step brackets, and
wherein said canister is exposed to the outside of the vehicle as viewed in a side elevation of the vehicle.

16. The canister layout structure according to claim 8, further comprising a pair of right and left step brackets for respectively supporting a pair of right and left passenger steps as footrests for a passenger, said pair of right and left step brackets being disposed at the lower portion of said body frame,
wherein said canister is surrounded by said body frame, said swing arm, said center stand, and said pair of right and left step brackets, and
wherein said canister is exposed to the outside of the vehicle as viewed in a side elevation of the vehicle.

17. The canister layout structure according to claim 2, further comprising piping connected to said canister;
wherein said piping is disposed between said cross member and said swing arm, and extends along said cross member.

18. The canister layout structure according to claim 1,
wherein an engine is mounted on said body frame;
wherein an exhaust pipe extends from said engine, the exhaust pipe including a first large-diameter portion and a second large-diameter portion; and
wherein said canister is located between said first large-diameter portion and said second large-diameter portion in side elevation of the vehicle.

19. The canister layout structure according to claim 2, wherein:
wherein an engine is mounted on said body frame;
wherein an exhaust pipe extends from said engine, the exhaust pipe including a first large-diameter portion and a second large-diameter portion; and
wherein said canister is located between said first large-diameter portion and said second large-diameter portion in side elevation of the vehicle.

20. The canister layout structure according to claim 3, wherein:
wherein an engine is mounted on said body frame;
wherein an exhaust pipe extends from said engine, the exhaust pipe including a first large-diameter portion and a second large-diameter portion; and
wherein said canister is located between said first large-diameter portion and said second large-diameter portion in side elevation of the vehicle.

* * * * *